(12) United States Patent
Perick

(10) Patent No.: US 8,741,405 B2
(45) Date of Patent: Jun. 3, 2014

(54) PACKAGE

(75) Inventor: Matthias Perick, Ahaus-Altstaette (DE)

(73) Assignee: Mondi Consumer Packaging Technologies GmbH, Gronau (DE)

( * ) Notice: Subject to any disclaimer, the term of this patent is extended or adjusted under 35 U.S.C. 154(b) by 190 days.

(21) Appl. No.: 13/495,634

(22) Filed: Jun. 13, 2012

(65) Prior Publication Data

US 2012/0328746 A1   Dec. 27, 2012

(30) Foreign Application Priority Data

Jun. 20, 2011 (DE) .................. 10 2011 051 193

(51) Int. Cl.
| | | |
|---|---|---|
| *B29D 22/00* | (2006.01) | |
| *B65D 30/08* | (2006.01) | |
| *B65D 30/20* | (2006.01) | |
| *B32B 5/18* | (2006.01) | |
| *B65D 75/00* | (2006.01) | |
| *B32B 27/30* | (2006.01) | |

(52) U.S. Cl.
CPC .............. *B65D 31/02* (2013.01); *B32B 2439/46* (2013.01); *B32B 5/18* (2013.01); *B65D 31/10* (2013.01); *B65D 75/008* (2013.01); *B32B 27/306* (2013.01)
USPC ....... 428/36.5; 383/110; 383/113; 428/319.3; 428/319.7; 428/319.9; 428/316.6; 428/314.8

(58) Field of Classification Search
CPC ........ B32B 5/18; B32B 27/306; B32B 27/34; B32B 27/36; B32B 2439/46; B65D 31/02; B65D 31/10; B65D 75/008
USPC .............. 428/36.5, 319.3, 319.7, 319.9, 36.9, 428/36.91, 316.6, 314.8, 315.5; 383/110, 383/113, 116; 426/127
See application file for complete search history.

(56) References Cited

U.S. PATENT DOCUMENTS

| | | | |
|---|---|---|---|
| 5,302,402 A * | 4/1994 | Dudenhoeffer et al. ...... | 426/129 |
| 6,051,174 A | 4/2000 | Park | |
| 7,449,240 B2 * | 11/2008 | Hamulski et al. .......... | 428/411.1 |
| 7,807,260 B2 * | 10/2010 | Nadella et al. ............ | 428/316.6 |
| 8,124,203 B2 * | 2/2012 | Semersky et al. ........... | 428/36.5 |
| 2003/0134126 A1 * | 7/2003 | Hamulski et al. ......... | 428/423.1 |
| 2004/0120611 A1 * | 6/2004 | Kannankeril et al. ........ | 383/110 |
| 2012/0328746 A1 * | 12/2012 | Perick ......................... | 426/127 |

FOREIGN PATENT DOCUMENTS

| | | |
|---|---|---|
| CA | 1145724 A | 5/1983 |
| JP | 2004091024 B | 3/2004 |
| JP | 2007230637 B | 9/2007 |

* cited by examiner

*Primary Examiner* — N. Edwards
(74) *Attorney, Agent, or Firm* — Andrew Wilford

(57) ABSTRACT

A package is formed a closed bag made of a multilayer film and contents enclosed in the bag. The film is folded to form the bag and has flat film sides and outer edges that are reinforced by weld seams. The film of the bag has a density of 0.5 g/cm³ to 0.9 g/cm³, a printable outer layer forming an outside surface of the package, an inner seal layer made of a sealable polymer forming an inside surface of the package, and a foamed polymer core layer between the outer layer and the inner layer. The contents are a lumpy or granular bulk material.

11 Claims, 2 Drawing Sheets

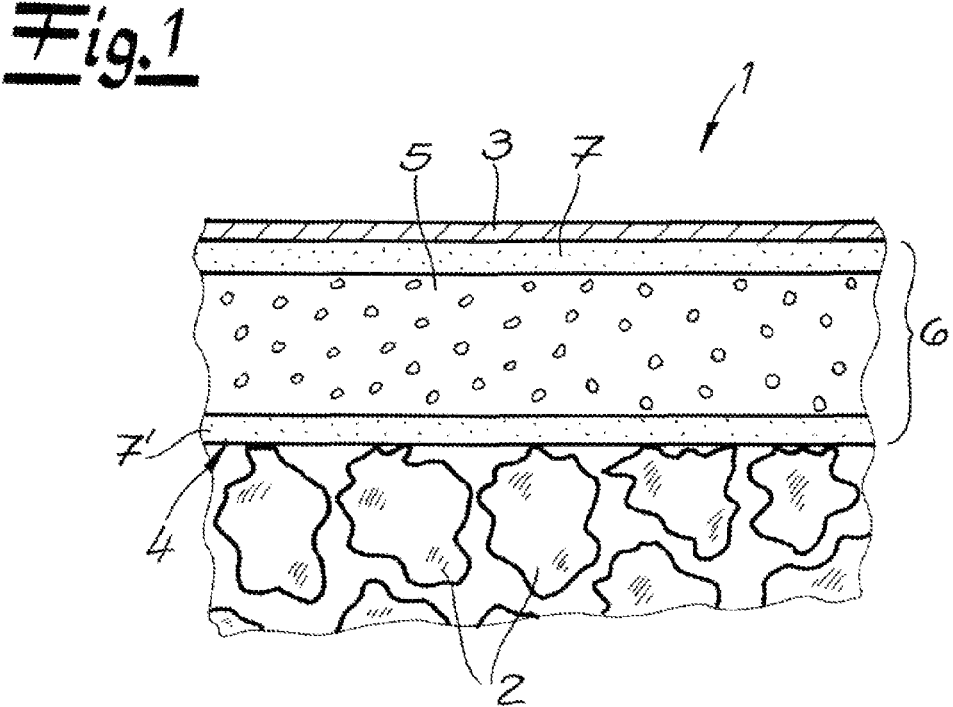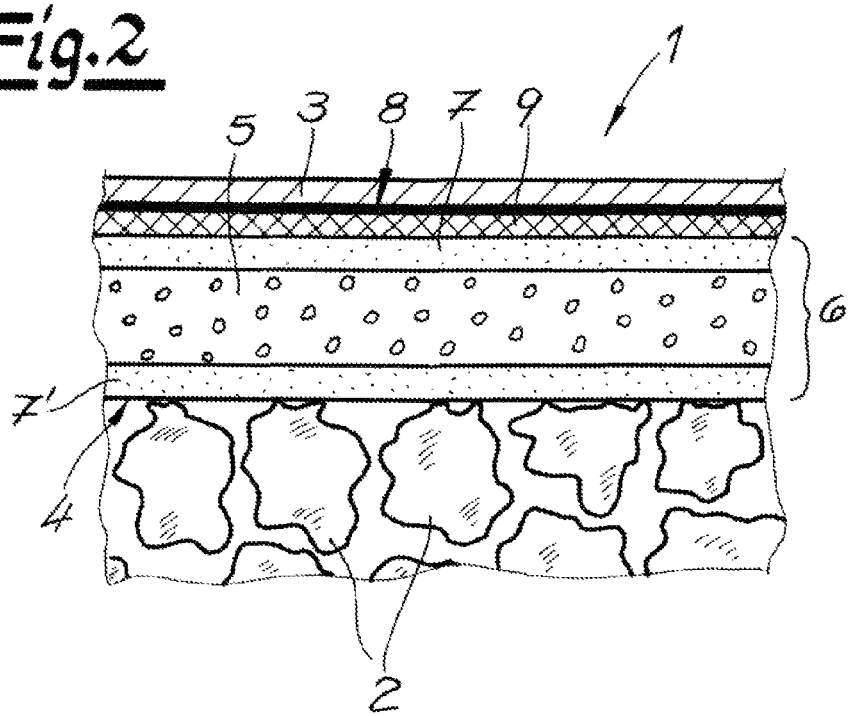

PACKAGE

FIELD OF THE INVENTION

The invention relates to a package comprising a closed bag made of a multilayer film and contents enclosed in the bag. The bag is formed by folding the film and has an outer shape defined by the folded film, flat film sides, and outer edges that are reinforced by weld seams.

BACKGROUND OF THE INVENTION

The bag can be, in particular, of a side-gusset bag that has longitudinal edges reinforced by weld seams, and that has been sealed shut by a header weld to create a package with an essentially cubical contents space after it is filled. A bag of this type is well-suited for large-volume packages and can be employed, in particular, to package chunk-type, pelletized, or is granular dry food for animals.

Many types of dry animal food are nuggets or granules that sometimes have sharp edges. These press through thin packaging material, thereby creating an uneven surface forming an outside surface of the package. This is found to be objectionable for aesthetic reasons. Thin packaging materials can also be pierced. In addition, the desired shape stability and static stability of the packaging is frequently insufficient. As a result, relatively thick packaging materials are therefore used in practice to produce stabile bags.

JP 2007/230637 discloses a bag made of a multilayer film laminate where an inside surface layer of the bag is made of a foamed polyolefin layer. The foamed polymer layer improves the resistance to penetration. The film laminate is used in particular for infusion solutions.

Published document JP 2004/091024 relates to a vacuum packaging made of a multilayer film that lies tightly against the contents after the packaging has been evacuated such that the shape of the contents is revealed through the film. The contents can involve granular solids, for example granulates. The layered structure of the film used as vacuum packaging comprises a seal layer, a barrier layer, an outer layer, and a foamed layer between the outer layer and the barrier layer.

Published document CA 1 145 724 relates to a vacuum packaging for packaging meat that has not been deboned. A foamed protective film is provided in regions of the packaging that come into contact with bones, the protective film being intended to prevent the outer wrapping of the packaging from being pierced.

Foamed films and multilayer films that have a foam intermediate or core layer have not been considered for bags that form an essentially cubical contents space and must be stable. In light of this fact, the object of the invention is to reduce the use of polymer in a bag for granular or lumpy bulk material and to provide a packaging that has superior shape stability along with low mass per unit surface area for the film, and that is characterized by high mechanical strength. The package should have an outer shape with essentially flat sides, the contents not being revealed on the film sides.

SUMMARY OF THE INVENTION

The package according to the invention comprises a closed bag that is made of a multilayer film and contents enclosed in the bag. The bag is formed by folding the film and has an outer shape defined by the folded film, the shape having flat film sides and outer edges that are reinforced by weld seams. The film of the bag has a density of 0.5 g/cm$^3$ to 0.9 g/cm$^3$ and has a printable outer layer forming an outside surface of the package, a seal layer made of a sealable polymer forming an inside surface of the package, and a foamed polymer layer. The contents are a lumpy or granular bulk material. The bulk material can, in particular, be lumpy, pelletized, or granular dry food for animals, or also chunk-type food products.

The foamed polymer layer of the film used for the bag can be provided between the seal layer and the outer layer of the film such that the seal layer is provided in this case as a pore-free polymer layer. It is also within the scope of the invention for the foamed polymer layer to consist of a sealable polymer, to an inside surface of the packaging, and simultaneously also create seal layer. The film can have a mass per unit surface area of between 30 g/m$^2$ und 150 g/m$^2$, a mass per unit surface area of between 50 g/m$^2$ und 100 g/m$^2$ being preferred. For the application according to the invention, the foamed polymer layer advantageously has a layer thickness of between 20 µm and 200 µm, in particular, a layer thickness of between 50 µm and 100 µm.

The foamed polymer layer can be produced either by a chemical process or physical process. In chemical foaming, a pelletized blowing agent is added to the polymer melt, which blowing agent generates foaming by a chemical reaction. With physical foaming, a blowing agent, in particular, $N_2$ or $CO_2$, is added to the plastic melt under high pressure. Before being metered in, the blowing agent is in the form of a supercritical fluid that combines the incompressibility of a fluid with the solubility of a gas. The blowing agent dissolves in the polymer melt and creates there in finely dispersed fashion a monophase system with the plastic melt. The rapid pressure drop when exiting the extrusion die enables nucleation sites to form in the polymer melt. The gas is liberated in controlled fashion from the melt, thereby creating a foam. The process can be controlled through pressure and temperature. One description of this process, among others, is provided in U.S. Pat. No. 6,051,174.

In a preferred embodiment of the invention, the foamed polymer layer of the film according to the invention has a microcellular structure generated by physical foaming. The microcellular structure is characterized by a pore structure having a mean pore size of less than 100 µm, although the pore size can also range between 0.1 µm and 10 µm. Based on the foam structure, the film according to the invention has a mass per unit surface area that is significantly lower than the mass per unit surface area of a pore-free film of identical thickness that is produced from the same polymer. The foam structure prevents the contents, which can have nugget-like or granular components with sharp edges, from pushing through. A side-gusset bag produced from the film has is longitudinal edges reinforced by weld seams and is characterized by high shape stability and static stability despite the low mass per unit surface area of the film. In addition, the microcellular foam structure that is characterized by a uniform cell structure enables an improved strength to be achieved, while variations in thickness are reduced. Since the foamed polymer layer does not include, or at most has very few, larger pores, there are no weak spots that could create a vulnerable site for nugget-like and granular components with sharp edges.

In a preferred embodiment of the invention, the outer layer of the film is applied to a multilayer polyethylene film that has a foamed core layer and unfoamed polyethylene outer layers sandwiching the core layer. Whereas the foamed core layer can have a layer thickness of 30 µm to 100 µm, the unfoamed polyethylene layers provided on both sides have a smaller layer thickness that is advantageously selected between 5 µm and 40 µm. The multilayer polyethylene film can be composed, in particular, of PE-LD, PE-LLD or a mixture of PE-LD and PE-LLD, and preferably has a density of between 0.6 g/cm³ and 0.8 g/cm³. The polymer mixture of the polyethylene film can also contain PE-ULD, PE-VLD, and PE-HD. The possibility of adding polypropylene should also not be excluded.

The polymer skeleton of the foamed polymer layer can contain nucleating agents, for example in the form of talcum. The use of nucleating agents yields a smaller and more uniform foam structure.

For the outer layer of the film used according to the invention, those polymers commonly employed for packaging purposes can be used that can be readily printed and create a high-quality surface. Especially well-suited here are polyesters, BOPP, and polyolefins, in particular, polyethylene.

In addition, a barrier layer, particularly one made of a metallized polymer, can be provided between the outer layer and the foamed polymer layer.

BRIEF DESCRIPTION OF THE DRAWING

In the drawing:

FIG. 1 is a large scale section through a wall of a package according to the invention;

FIG. 2 is a section like FIG. 1 through another package according to the invention;

DETAILED DESCRIPTION

Figure 3:
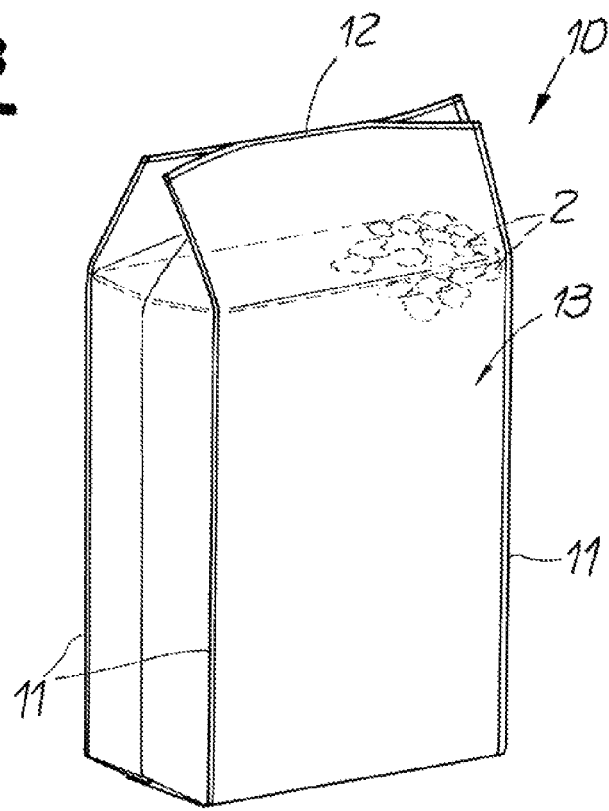
FIG. 3 is a small-scale perspective view of a package having a side-gusset bag according to the invention.

FIG. 1 shows a section through the wall of a bag made of a multilayer film 1, the bag being used to package lumpy or granular bulk material 2. This bulk material 2 is, in particular, dry food for animals that contains components having sharp edges. The bag is formed by folding the film and has an outer shape defined by the folded film, the shape having flat film sides and outer edges that are reinforced by weld seams. After it is filled, the bag is sealed shut by a header weld.

The layer structure of the multilayer film 1 comprises a printable outer layer 3 forming an outside surface of the package, a seal layer 4 made of a sealable polymer forming an inside surface of the package, as well as a foamed polymer core layer 5. Due to the foamed polymer core layer 5, the film 1 has a density of is between 0.5 g/cm³ and 0.9 g/cm³, a density of between 0.6 g/cm³ and 0.8 g/cm³ being preferred. The mass per unit surface area for the film ranges between 30 g/m³ and 150 g/m³, in particular, between 50 g/m³ and 100 g/m³.

The layer diagram of FIG. 1 shows that the outer layer 3 is applied to a multilayer polyethylene film 6 that has the foamed polymer core layer 5 and unfoamed polyethylene layers 7 and 7' on both sides of the core layer. The polyethylene layer 7' simultaneously forms the seal layer. The foamed polymer core layer 5 has a microcellular structure that is generated by physical foaming. A blowing agent—preferably, nitrogen or $CO_2$—is added to the polymer melt during the process of physical foaming. The blowing agent is present under high pressure as a supercritical fluid that completely dissolves in the polymer melt and in a finely dispersed state creates a monophase system with the plastic melt. The rapid pressure drop during extrusion enables nucleation sites to form so that the gas is released from the melt and a microcellular structure is created. The process can be controlled so that the microcellular structure has pores of a pore size of less than 10 µm, although the pore size can also range between 0.1 µm and 10 µm. Adding nucleating agents, for example in the form of talcum, yields smaller and more uniform cell sizes. The polymer lattice of foamed polymer core layer 5 can therefore also contain nucleating agents that are added to the polymer melt to improve the foaming process.

The multilayer polyethylene film 6 can be made of PE-LD, PE-LLD, or a mixture of PE-LD and PE-LLD, and has a mean density of between 0.6 g/cm³ and 0.8 g/cm³. The polymer lattice of the foamed polymer core layer 5 can also contain inorganic nucleating agents that are added to the polymer melt to improve the foaming process. Adding nucleating agents yields smaller and more uniform cell sizes for the foam.

The foamed polymer layer has a layer thickness of between 30 µm and 100 µm. The outer layer is preferably made of polyester, BOPP, or a polyethylene.

A barrier layer 8 is provided in addition between the outer layer 3 and the foamed polymer core layer 5 in the embodiment of FIG. 2. The barrier layer 8 is an evaporated-aluminum layer on substrate film 9, for example one made of a polyester (PET). The barrier layer can also be made of EVOH or a polyamide. Not shown in the figure are a printing layer formed by printing dyes and adhesive layers formed by a laminating adhesive.

EXAMPLES

Example 1

A multilayer film having the layer structure shown in FIG. 1 has a 12-µm-thick outer layer made of polyethylene terephthalate (PET) that is applied by a lamination process to a foamed polyethylene film 125 µm thick. The polyethylene film has a mass per unit surface area of 78 g/m² and a density of 0.6240 g/cm³. The foamed polyethylene film is of multilayer structure and has a foamed core layer made of PE-LD and PE-LLD, as well as 20-µm-thick unfoamed polyethylene layers provided on both sides of the core layer that are also made of PE-LLD and PE-LD. The foamed core layer has been expanded by physical foaming using $N_2$ as the blowing agent from 40 µm up to 85 µm. The layer has a microcellular structure and contains inorganic nucleating agents that are added to the polymer melt to improve the foaming process. The nucleating agent is talcum that is used, for example, in an amount of 15 wt. % based on the polymer of the foamed core layer.

The described film replaces a standard film referenced for comparison that has a 12-µm-thick outer layer made of PET and a 120-µm-thick multilayer polyethylene film having a mass per unit surface area of 113.34 g/m² or a density of 0.9445 g/cm³.

Example 2

The film according to the invention has a layer structure as shown in FIG. 2. The layer structure comprises a 12-µm-thick outer film made of polyethylene terephthalate (PET), a 12-µm-thick barrier layer made of a metallized polyester (PET met), and a 100-µm-thick foamed polyethylene film. The polyethylene film has three layers, and has a foamed core layer as well as unfoamed PE layers provided on both sides of the core layer. A mixture of PE-LD and PE-LLD is used both for the core layer and the unfoamed edge layers. The layers along the edges have a layer thickness of 20 µm. The core layer has been expanded by foaming from 40 µm to 60 µm using $N_2$ as the blowing agent. The polymer lattice of the foamed core layer contains inorganic nucleating agents that have been added to the core layer in an amount of 15 wt. % based on the polymer and is talcum. The foamed polymer layer has a density of 0.72 g/cm$^3$ and a mass per unit surface area of 72 g/m$^2$.

The film according to the invention replaces a laminate referenced for comparison that has a layer structure of 12 μm of PET/12 μm PET met/100 μm PE, whereby the polyethylene being used is a mixture of PE-LLD and PE-LD.

The film referenced for comparison has a mass per unit surface area of 92.91 g/m$^2$ and a density of 0.9291 g/cm$^2$.

Example 3

This embodiment is a laminate having a 20-μm-thick outer layer of BOPP and ad 67-μm-thick foamed PE film. The foamed PE film has a 41-μm-thick foamed core layer, as well as 13-μm-thick unfoamed polyethylene layers each on both sides of the core layer. The core layer has been expanded by adding N$_2$ as the blowing agent from 27 μm to 41 μm. All layers of the PE film are made of PE-LLD and PE-LD, an inorganic nucleating agent having been added to the core layer to improve the microcellular structure. The foamed PE film has a mass per unit surface area of 48 g/m$^2$ and a density of 0.7164 g/cm$^2$.

The laminate according to the invention replaces a film that has an outer layer of 20 μm BOPP and a 50-μm-thick PE layer, the PE film having a mass per unit surface area of 48.47 g/m$^2$ and a density of 0.9694 g/cm$^3$. Using the identical material in terms of polyethylene, the film according to the invention has a significantly higher film strength, thereby improving the shape stability of the package produced from the film.

Example 4

The embodiment relates to a laminate that has a 20-μm-thick outer layer of BOPP and a 50-μm-thick foamed polyethylene film. The PE film has a 30-μm-thick foamed core layer as well as 10-μm-thick unfoamed PE layers on both sides of the core layer. All layers are made of PE-LLD and PE-LD, whereby the polymer matrix of the core layer additionally contains inorganic nucleating agents that have been added to the polymer melt to improve the foaming process. Foaming is effected using nitrogen as the blowing agent.

The film replaces a laminate having an outer layer of BOPP (20 μm) and a 50-μm-thick PE substrate without an loss in quality The foam structure enables the identical film strength to be achieved while using a smaller amount of PE material.

Based on the films described in examples 1 through 4, it has been possible to produce side-gusset bags 10 that have longitudinal edges 11 reinforced by weld seams and that are sealed shut by a header weld 12 to create a package having an essentially cubical contents space 13. The packages are well-suited for packaging dry animal food. They are stable in shape, statically stable, and tear-resistant. The package is illustrated by way of example in FIG. 3.

Figure 4:
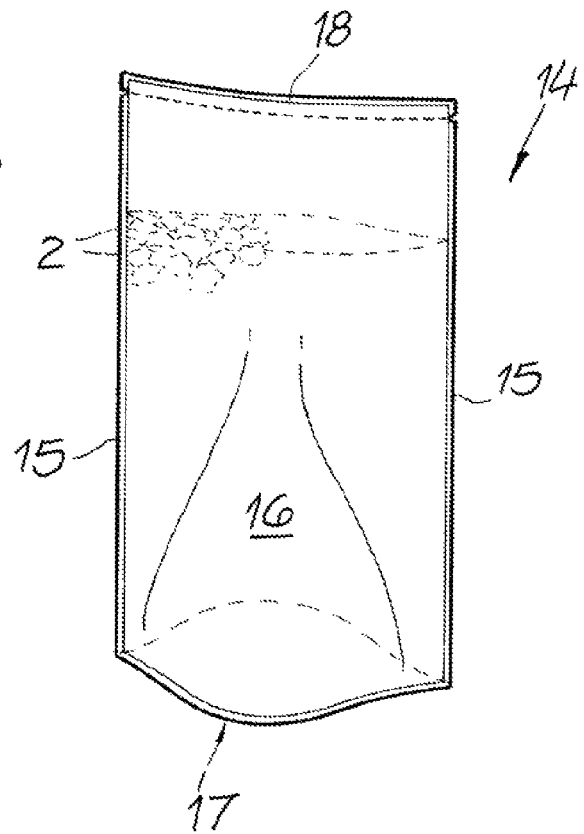
FIG. 4 is a small-scale perspective view of another package in accordance with the invention.

FIG. 4 shows a variant embodiment of the invention in which the bag of the package is a stand-up bag 14 that has two front sides 16 directly connected by longitudinal weld seams 15 and a film floor 17 formed by a floor fold, and that after filling is sealed shut by a header weld 18 connecting front sides 16. The filling volume of the stand-up bag 14 is smaller than that for the side-gusset bag 10 shown in FIG. 3 and is therefore intended, in particular, for packages of lumpy food products, for example poultry parts.

The invention claimed is:

1. A package comprising a closed bag made of a multilayer film and contents enclosed in the bag, wherein the bag is formed by folding the film and has an outer shape defined by the folded film, flat film sides, and outer edges that are reinforced by weld seams, the film of the bag having
    a density of 0.5 g/cm$^3$ to 0.9 g/cm$^3$ and a printable outer layer forming an outside surface of the package,
    an inner seal layer made of a sealable polymer forming an inside surface of the package, and
    a foamed polymer core layer between the outer layer and the inner layer, the contents being a lumpy or granular bulk material.

2. The package according to claim 1, wherein the contents is chunk-type, pelletized, or granular dry food for animals.

3. The package according to claim 1, wherein the contents is chunk-type food products.

4. The package according to claim 1, wherein the film has a mass per unit surface area of between 30 g/m$^2$ and 150 g/m$^2$.

5. The package according to claim 1, wherein the foamed polymer core layer has a microcellular structure generated by physical foaming.

6. The package according to claim 1, wherein the outer layer is applied to a multilayer polyethylene film that has a foamed polymer core layer, and unfoamed polyethylene layers on both sides of the core layer.

7. The package according to claim 6, wherein the multilayer polyethylene film is made of PE-LD, PE-LLD, or a mixture of PE-LD and PE-LLD, and has a density of between 0.6 g/cm$^3$ and 0.8 g/cm$^3$.

8. The package according to claim 1, wherein the polymer of the foamed polymer core layer contains inorganic nucleating agents.

9. The package according to claim 1, wherein the foamed polymer core layer has a layer thickness of 20 μm to 200 μm.

10. The package according to claim 1, wherein the outer layer is made of polyester, BOPP, or a polyolefin.

11. The package according to claim 1, further comprising:
    a barrier layer made of a metallized polymer between the outer layer and the foamed polymer core layer.

* * * * *